(12) United States Patent
Desai et al.

(10) Patent No.: US 11,650,934 B1
(45) Date of Patent: May 16, 2023

(54) CACHE EVICTION METHODS

(71) Applicant: Dell Products L.P., Round Rock, TX (US)

(72) Inventors: Keyur B. Desai, Cary, NC (US); Xiaobing Zhang, Saratoga, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/456,983

(22) Filed: Nov. 30, 2021

(51) Int. Cl.
  *G06F 12/123* (2016.01)
  *G06F 12/0831* (2016.01)
  *G06F 12/0891* (2016.01)

(52) U.S. Cl.
  CPC ........ *G06F 12/123* (2013.01); *G06F 12/0833* (2013.01); *G06F 12/0891* (2013.01)

(58) Field of Classification Search
  CPC . G06F 12/0833; G06F 12/0891; G06F 12/123
  See application file for complete search history.

(56) References Cited

U.S. PATENT DOCUMENTS

| | | | | |
|---|---|---|---|---|
| 9,569,367 B1* | 2/2017 | Wigmore | ........... | G06F 12/0868 |
| 9,582,421 B1* | 2/2017 | Agarwala | ........... | G06F 12/0246 |
| 9,921,963 B1* | 3/2018 | Li | ........ | G06F 12/0833 |
| 11,599,462 B1 | 3/2023 | Hawkins | | |
| 2012/0221774 A1 | 8/2012 | Atkisson et al. | | |
| 2014/0115244 A1* | 4/2014 | Maybee | ............ | G06F 12/0897 |
| | | | | 711/E12.024 |
| 2016/0062916 A1* | 3/2016 | Das | ...... | G06F 12/1027 |
| | | | | 711/133 |
| 2017/0031823 A1 | 2/2017 | Ross et al. | | |
| 2017/0235681 A1* | 8/2017 | Kaburaki | ........... | G06F 12/0292 |
| | | | | 711/128 |
| 2017/0329720 A1* | 11/2017 | Bedi | ..................... | G06F 12/123 |

OTHER PUBLICATIONS

John L. Hennessy and David A. Patterson, Computer Architecture: A Quantitative Approach, 2019, Morgan Kaufmann, Sixth Edition, Appendix pp. B13 and B39 (Year: 2019).

* cited by examiner

*Primary Examiner* — Aracelis Ruiz
(74) *Attorney, Agent, or Firm* — Workman Nydegger

(57) ABSTRACT

One example method includes a cache eviction operation. Entries in a cache are maintained in an entry list that includes a recent list and a frequent list. When an eviction operation is initiated or triggered, timestamps of last access for the entries are adjusted by corresponding adjustment values. Candidates for eviction are identified based on the adjusted timestamps of last access. At least some of the candidates are evicted from the cache.

18 Claims, 7 Drawing Sheets

Figure 3A

CACHE EVICTION METHODS

FIELD OF THE INVENTION

Embodiments of the present invention generally relate to caching in computing systems. More particularly, at least some embodiments of the invention relate to systems, hardware, software, computer-readable media, and methods for evicting data from caches in computing systems.

BACKGROUND

In computing systems, data is often stored on a storage device such as a hard drive. When needed, the hard drive is accessed to retrieve and use the data. In order to improve this process, caches are used. A cache is typically implemented in a memory that is faster than the hard drive. Data from the hard drive can be cached in the cache and accessed more quickly. As a result, caches tend to improve the performance of the computing system at least by avoiding the need to access the hard drive when the data is cached.

The size of the cache, however, is limited or fixed in size and is typically smaller than the hard drive. As a result, it is necessary to remove or evict data from the cache when the cache is full or for other reasons. Various cache eviction techniques exist, including least recently used (LRU) and least frequently used (LFU). Another method for evicting data from a cache is a time threshold-based eviction. Entries in the cache whose latest access was earlier than a threshold time are candidates for eviction.

The time threshold-based eviction method has some problems. For example, some entries in the cache, even though frequently used and frequently accessed, become candidates for eviction when they satisfy the eviction criteria. Further, in a cache that limits the number of evictions, some entries may stay in the cache at the expense of other more frequently used entries because the eviction thread does not reach these entries due to the limit. Improvements in caching methodologies are needed.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 3A discloses aspects of managing a cache directory or a cache entry list;

DETAILED DESCRIPTION OF SOME EXAMPLE EMBODIMENTS

Embodiments of the present invention generally relate to caching systems and caching operations. More particularly, at least some embodiments of the invention relate to systems, hardware, software, computer-readable media, and methods for caching operations including cache entry operations and cache eviction operations.

In general, example embodiments of the invention relate to cache eviction operations. Effective eviction strategies can improve the performance of the cache, applications that use the cache, and the operation of the computing system in general.

Embodiments of the invention relate to caching operations such that items that are most recently used and/or most frequently used are able to obtain or are given a longer time to live (TTL) in the cache. By giving at least some of the entries in the cache a longer TTL, some of the entries do not become candidates for eviction using time threshold-based eviction operations. This helps improve cache operations by evicting entries that are less likely to be accessed compared to other entries in the cache.

This is generally achieved by adjusting the timestamps of at least some of the cached entries. By adjusting the timestamps and creating adjusted timestamps, at least some of these entries no longer candidates for certain cache eviction operations.

Embodiments of the invention are described in the context of various caching methodologies including methodologies based on frequency such least frequently used (LFU) and methodologies based on recency such as least recently used (LRU). By way of example and without limitation, recency refers to when an entry was accessed relative to other entries, and frequency refers to how many times an entry has been accessed.

Embodiments of the invention are also disclosed in the context of adaptive replacement cache (ARC) and time threshold-based methodologies. ARC is a method of cache management that uses aspects of both recency and frequency. A time threshold-based methodology identifies candidates for eviction based on a time threshold.

Embodiments of the invention improve caching methodologies by introducing an adjustment mechanism to improve caching performance. The following discussion described aspects of these caching methodologies.

Figure 1B:
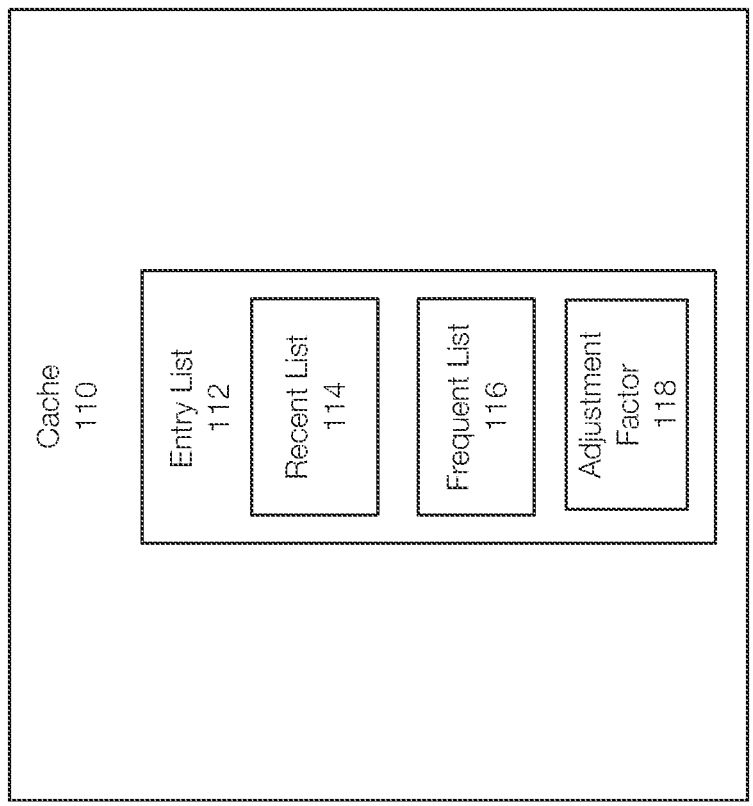
FIG. 1B discloses additional aspects of a cache configured to evict entries based on adjusted entry characteristics.
Figure 1A:
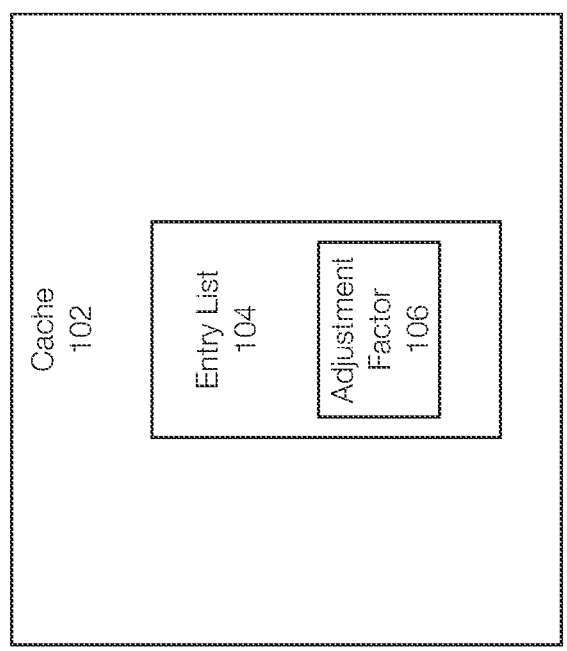
FIG. 1A discloses aspects of a cache where cache evictions are determined by adjusting characteristics of the cache entries.

FIG. 1A illustrates an example of a cache that is managed using a least recently used (LRU) methodology. The cache 102 includes an entry list 104. The cache 102 operates by maintaining an ordered list of cache entries (e.g., a cache directory) in the entry list 104. The entries in the list may include {key,value} pairs. The entry list 104 may identify the data in different manners.

The entry list 104 is sorted based on time of the most recent access. Thus, new entries to the cache 102 are added at the top of the list 104, after the bottom entry has been evicted from the list 104. If an existing entry in the cache 102 is hit (or accessed), the corresponding entry in the list 104 is moved to the top of the list 104. This ensures that the least recently used entries move towards the bottom of the list and are eventually evicted. Periodically or for other reasons, an eviction operation may be performed. The eviction operation may use an adjustment factor 106 to identify candidates.

FIG. 1B illustrates an example of a cache that is managed using adaptive replacement cache (ARC) in accordance with embodiments of the invention. The cache 110 similarly includes an entry list 112. In this example, the entry list 112 is divided into two lists: a recent list 114 and a frequent list 116. The sizes of the lists 116 and 118 may or may not be fixed in size. The respective sizes of the lists 116 and 118 can change over time in some embodiments.

When data is added to the entries in the cache 110 for the first time, an entry is made for that data in the recent list 114. This entry then moves down the recent list 114 as newer entries are entered into the recent list 116. If that entry is accessed a second time, that entry is moved to the frequent list 116. In effect, the recent list 114 is an LRU list. The frequent list 116 allows the cache 110 to account for entries that are frequently accessed. The frequent list 116 also has aspects of an LRU list. The entry list 112 can account for both recency and frequency. During an eviction operation, an adjustment factor 118 may be used to identify candidates for eviction as discussed herein.

Figure 2:
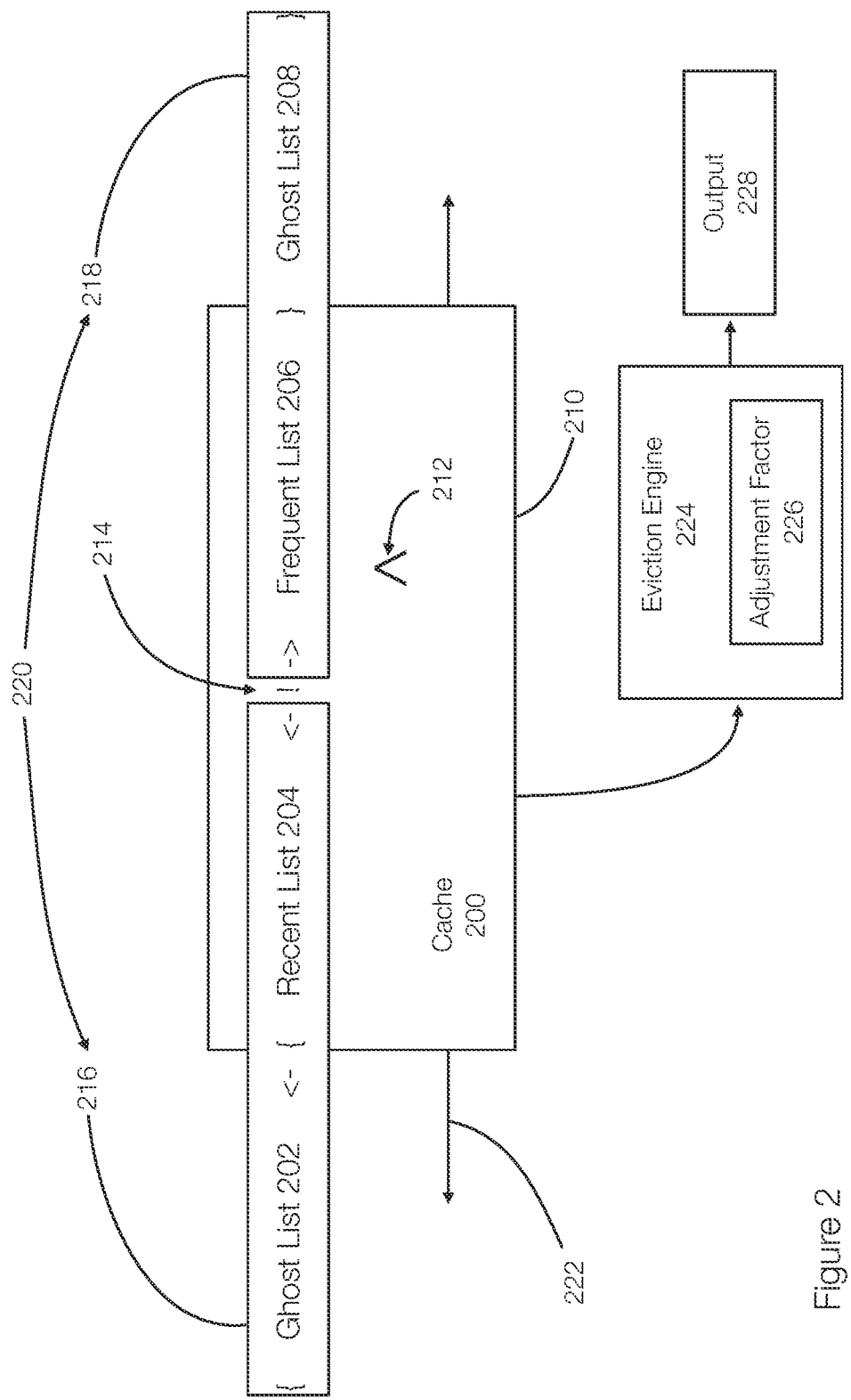
FIG. 2 discloses aspects of an eviction engine configured to identify and evict entries from a cache.

FIG. 2 illustrates a more detailed example of a cache directory or entry list in accordance with embodiments of the invention. FIG. 2 illustrates a cache 200 that is configured to store data or cache data that may be used, for example, by an application. The cache 200 typically has a fixed size, represented by the box 210. The contents or data stored in the cache 200 is referenced in a cache directory or entry list 220. The entry list 220 includes a list 216 and a list 218. The list 216 is typically configured to store or list entries with respect to recency. The list 218 is configured to store or list entries in the cache 200 with respect to frequency and/or recency.

The list 216 includes a recent list 204 and an associated ghost list 202. The recent list 204 includes entries whose data is present in the cache 200. The ghost list 202 includes metadata associated with data that was recently in the cache 200. The list 218 similarly includes a frequent list 206 and an associated ghost list 208.

The top of the list 216 and the top of the list 218 are associated with the marker 214 (illustrated as an "!"). The marker 212 (illustrated as an "^"), represents a target size for the list 216 or, more specifically, for the recent list 204. In one example, the target size of the list 216 (or more specifically the recent list 216) is larger than the target size of the list 218 (or more specifically the frequent list 206). In effect, the marker 214 conveys the actual sizes of the lists 216 and 218 in the cache 200. As illustrated, the actual sizes of the lists 216 and 218 (or the lists 204 and 206) may differ from the target sizes.

As entries are added to and/or removed from the lists 216 and 218, their relative sizes may change. In other words, the marker 214 may move or change during operation of the cache. The marker 214 can reference a location or position relative to the entry list 220. Entries in the list 216 are illustrated to the left of the marker 214. When an entry is added to the list 216, the entry is added at the top (e.g., next to the marker 214) and the remaining entries in the list 216 shift to the left (or away from the marker) as needed. Similarly, entries added to the list 218 are added to the right of the marker 214 and the remaining entries in the list 218 shift to the right as needed. Also, it is understood that the implementation of the entry list 220 may have no concept of direction but may be implemented using an appropriate data structure. Generally, the structure or list is configured such that the entries are arranged in a time-related manner. However, this structure or arrangement is not limiting and other structures or list arrangements are within the scope of embodiments of the invention. The description of FIG. 2 aids in understanding the relationship between the cache size, entries in the cache, and the manner in which the entries are identified in the directory or entry list 220.

As previously stated, the list 216 includes two portions in this example: the recent list 204 and the associated ghost list 202. The ghost list 202 is an extension of the recent list 204. The recent list 204 operates much like an LRU list. The recent list 204 is for recent entries into the cache 200 and the ghost list 202 is for entries that have been recently evicted from the recent list 204 but are still tracked. The ghost list 202 keeps a history of recently evicted entries from the recent list 204. The ghost list 202 only contains metadata (e.g., keys for cache entries) and not the resource or data itself. When an entry moves into the ghost list 202 from the recent list 204, the data or actual resource is discarded. The ghost list 202 and the recent list 204 represent a history of resources that have been accessed a single time.

The list 218 includes two portions in this example: the frequent list 206 and the associated ghost list 208. The ghost list 208 is an extension of the frequent list 206. Entries evicted from the frequent list 206 are inserted or added to the ghost list 208. The ghost list 208 stores recently evicted entries from the frequent list 206. The ghost list 208 only contains metadata (e.g., keys for cache entries) and not the resource or itself. When an entry moves from the frequent list 206 to the ghost list 208, the metadata is retained, and the data or resource is discarded. The list 218 is configured to store entries that have been accessed multiple times.

In sum, new entries are added to the recent list 204 at the top and are gradually pushed to the left (in this visual example). Eventually, these entries are pushed out of the recent list 204 into the ghost list 202 and then dropped out of the ghost list 202. Similarly, entries to the list 218 are added at the top of the frequent list 206. These entries move to the right and are evicted to the ghost list 208 and then evicted from the from the ghost list 208.

In some embodiments, entries in the list 216 have only been accessed once. When entries in the list 216 are accessed a second time, these entries are moved to the list 218. Entries reentering the cache 200 cause the marker 214 to move towards the marker 212. If no free space exists in the cache 200, the relative position of the marker 214 to the marker 212 determines whether an entry is evicted from the list 218 or the list 216 (or from the recent list 204 or the frequent list 206).

For example, a hit in the ghost list 202 will increase the size of the recent list 204 and push the marker 212 to the right. In this example, the last entry in the ghost list 208 is evicted.

A hit in the ghost list 208 shrink the recent list 204 and push the marker 212 back to the left. The last entry in the list 216 is evicted. More specifically, the last entry of the recent list 204 is evicted to the ghost list 202 and the last entry of the ghost list 202 is evicted and discarded in this example.

A cache miss does not affect the marker 212, but the marker 214 moves closer to the marker 212.

In one example each of the lists 216 and 218 (or the portions thereof) is substantially operated as a least recently used list. As previously stated, however, the list 218 also accounts for frequency of access. The arrow 222 illustrates that the cache 200, which may be fixed in size, can move freely across the history represented by the lists 216 and 218.

At times, the eviction engine 224 may perform an eviction operation. The eviction engine 224 applies an adjustment factor 226 to the entry list 220 and generates an output 228, which includes candidates for eviction. At least some of the candidates may be evicted.

Figure 3A:
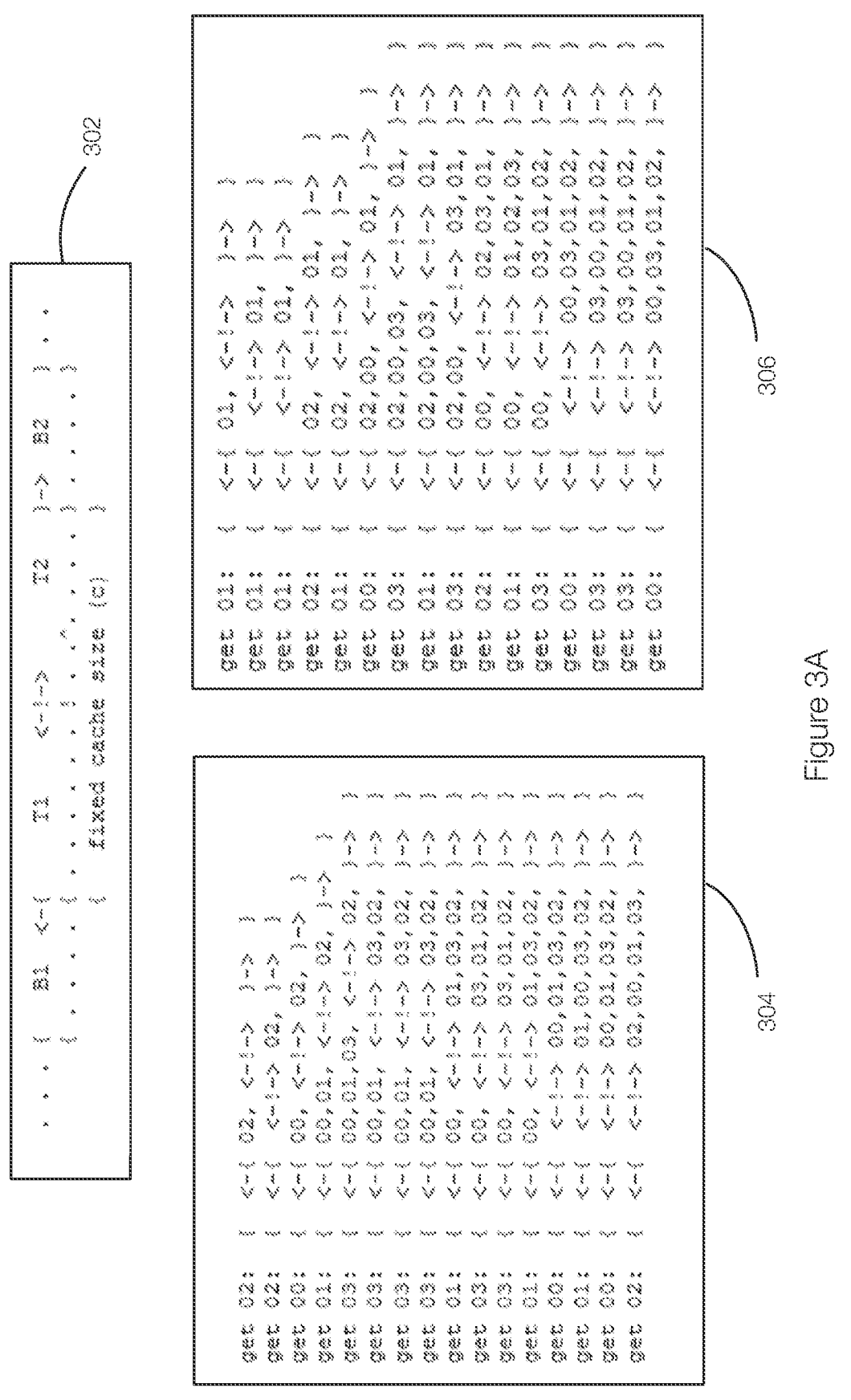

FIG. 3A illustrates operation of a cache in accordance with embodiments of the invention. FIG. 3A illustrates a cache 302 having a fixed cache size (c). The recent list is represented by T1, and the associated ghost list is represented as B1. The frequent list and associated ghost list are represented, respectively, by T2 and B2. The commands 304 are an example of how entries are handled in the cache 302 and in the entry list. The commands 306 illustrate another example of how entries are handled in the cache 302 or in the entry list. The ghost lists (B1 and B2) are ignored in the example shown in FIG. 3A.

In this example, the cache 302 can handle 4 entries. The first command of get 02 in the commands 204 results in 02 being placed in the T1 list at the top. The next get 02 command causes the 02 entry to move to the top of the list T2. This occurs because the entry 02 is accessed recently and more than once. A second access moves the entry 02 from the T1 list to the T2 list. The entry 02 is not accessed again until the last command in the commands 304. This command illustrates that the entry 02 moves from the bottom of the T2 list to the top of the T2 list. The T1 list can account for recency. The T2 list can account for recency and frequency. A review of the entries in the commands 304 illustrates that the sizes of the T1 and T2 lists change as entries are added or moved from one list to another list. If a new command get 05 were added to the commands 304, the entry 05 would be inserted at the top of the T1 list and the 03 entry would be evicted from the T2 list in one example.

The commands 306 illustrate another example of commands that impact the contents or entries in the cache. Generally, the first time data is accessed, an entry is added to the T1 list. Entries in the T1 list gradually move to the bottom and are eventually evicted unless hit a second time. When hit the second time, the entries are moved to the top of the T2 list. Entries in the T2 list gradually move to the bottom and are evicted eventually unless hit again. Each hit to an entry in the T2 list moves the entry back to the top of the T2 list.

Figure 3B:
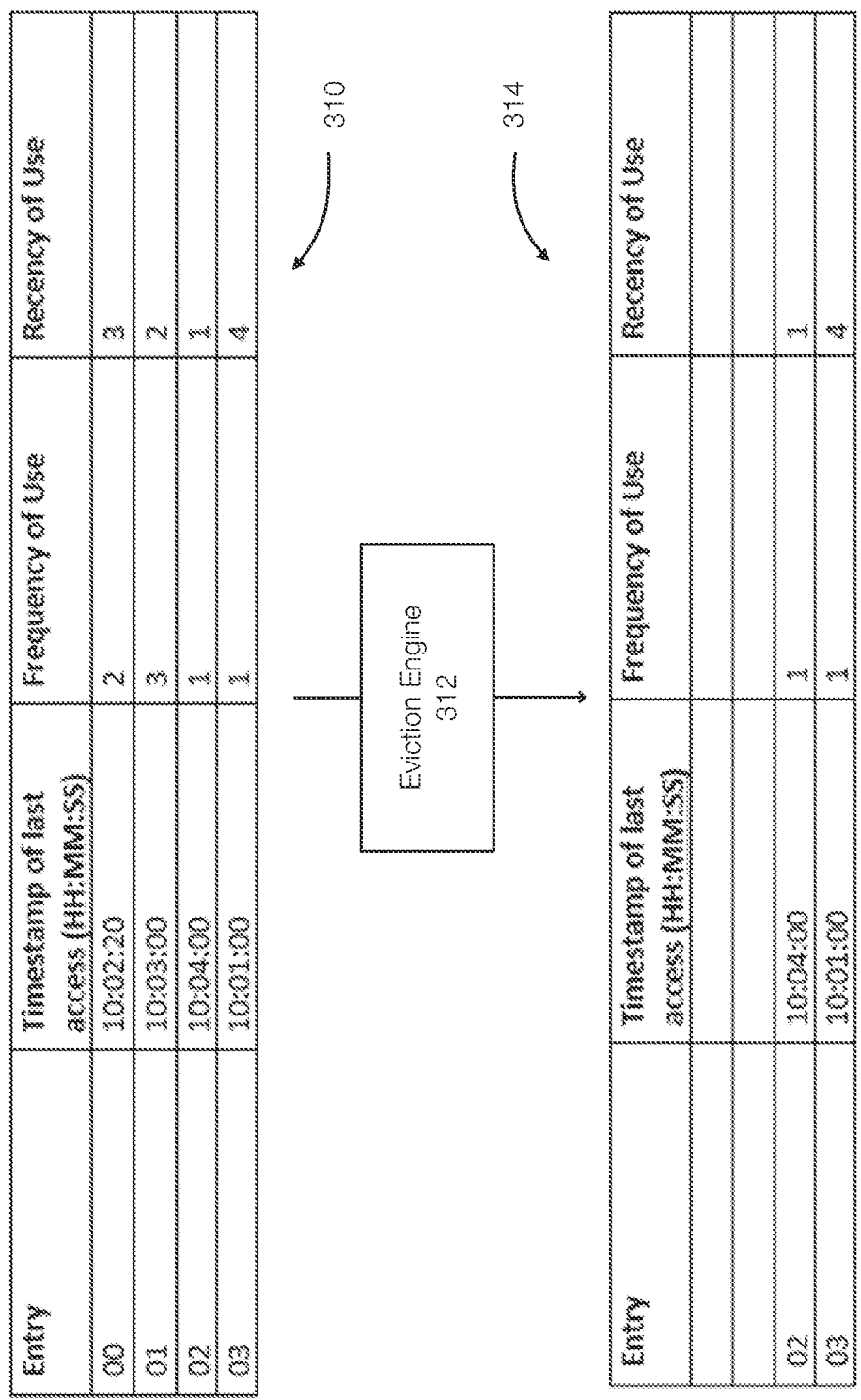
FIG. 3B discloses aspects of performing an eviction operation.

FIG. 3B discloses aspects of a time threshold-based cache management. In this example, a table 310 illustrates a cache that stores four entries: 00, 01, 02 and 03. The table 310 illustrates, for each entry, a timestamp of last access, a frequency of use, and a recency of use. Entries whose frequency of use is greater than 1 are in the T2 or frequent list while entries whose frequent of use is equal to 1 are in the T1 or recent list.

When evicting entries based on time (e.g., earlier than a certain time), it is possible for entries that are more recently/frequently used to be evicted due to their access timestamp compared to the eviction criteria. If the eviction process is limited to evicting N entries, items that are less recently/frequently used may stay in the cache because the eviction process never processed those entries (i.e., N entries have already been evicted prior to reaching those entries).

The table 310 in FIG. 3B illustrates the status of cache entries at a point in time when an eviction engine 312 executes an eviction process to evict stale entries from the cache. The eviction process is configured to evict two entries using a threshold time of 10:03:01 in this example. Using this threshold, there are three entries that are candidates for eviction (00, 01, 03) because each has a timestamp of last access that is less than (or earlier than) the threshold time. However, the eviction process is configured to evict a maximum of two entries. If the cache entries are processed linearly and the number of evictions is limited to 2, the entries 00 and 01 will be evicted from the cache.

As illustrated in the table 314, the result is not optimal. The table 314 illustrates the cache after running the eviction process. As illustrated, only the entries 02 and 03 remain in the cache. This may not be an optimal result.

For example, an evaluation of the recency and frequency of the entries remaining in the cache demonstrates that the timestamp of the entry 03 was earlier than or occurred before the timestamps of the entries 00 and 01. The remaining entries 02 and 03 were less frequently used than the evicted entries 00 and 01. The remaining entry 03 has a less recency of use compared to evicted entries 00 and 01. This demonstrates that the eviction thread evicted entries from the cache when there were better candidates for eviction. More specifically, this suggests that the entry 03 should have been evicted before the entries 00 and 01

Figure 3C:
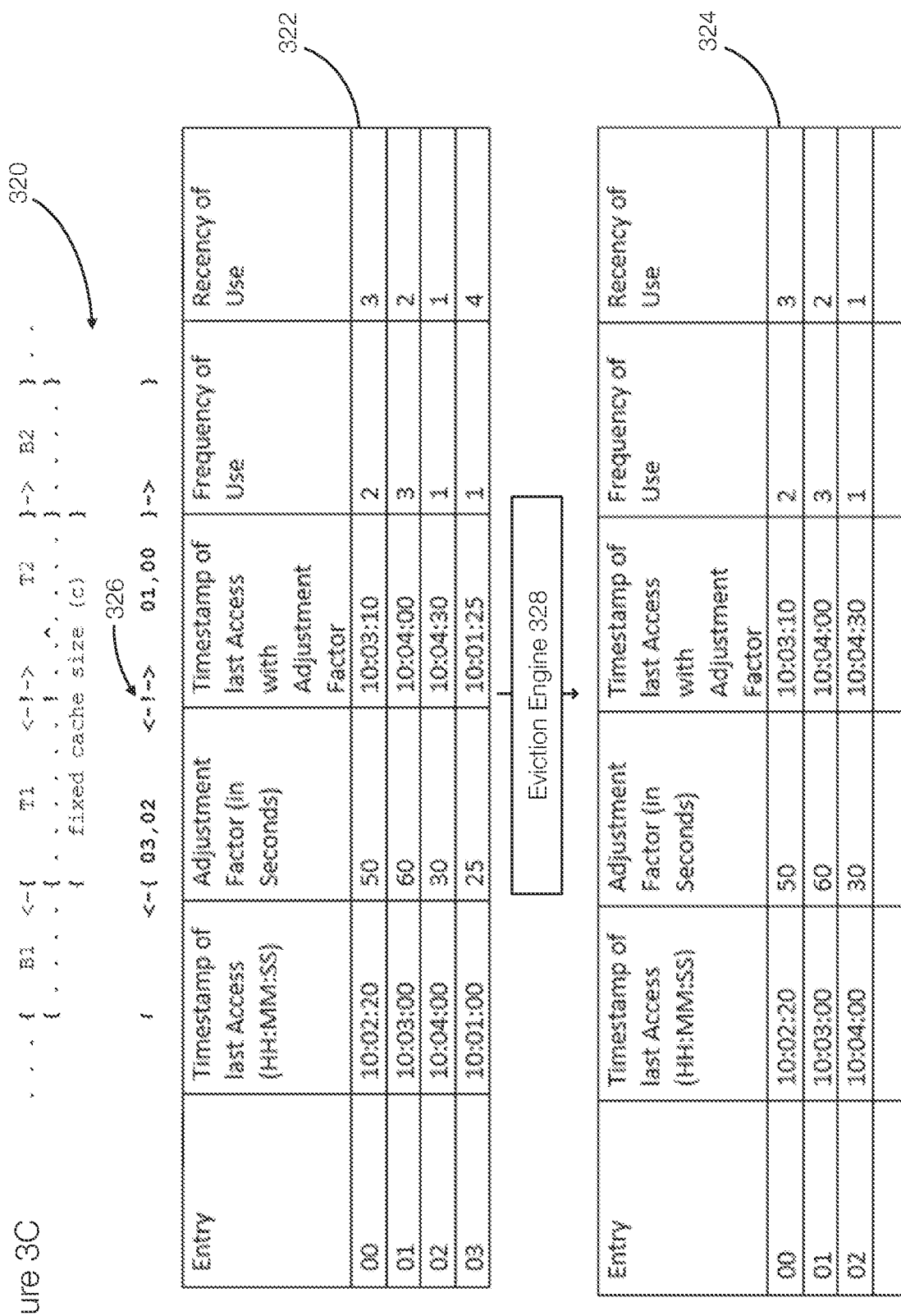
FIG. 3C discloses aspects of performing an eviction operation based on adjusted cache entries.

FIG. 3C discloses aspects of an eviction operation using an adjustment factor. The adjustment factor is configured to improve the efficiency of the cache eviction operations and to ensure that more optimal candidates are identified and evicted by the eviction engine. The adjustment factor is used to adjust at least one characteristic or metadata of the cache entries.

FIG. 3C illustrates a cache 320 that includes four entries: 00, 01, 02, and 03. Entries 02 and 03 are in the T1 list while the entries 00 and 01 are in the T2 list. When the eviction engine executes on the table 322, which is representative of the cache entries, the entries are provided with an adjustment factor. The adjustment factor is applied to the timestamp of last access to generate a timestamp of last access with adjustment factor. Thus, the adjustment factor is used to generate adjusted timestamps.

The adjustment factor can be implemented in many different ways and configurations. By way of example only and not limitation, the adjustment factors for entries in the T1 list may be determined as follows. The top entry (which is 02 in T1 list of the cache 320) is given an adjustment factor of 30 seconds. The next entry in the T1 list (03) in this example, is given an adjustment factor of 25 seconds. In this example, the adjustment factor decreases for entries further from the top of the list or further from the marker 326. As a general rule by way of example only, entries in the T1 or recent list nearer to the top are adjusted using an adjustment factor that is larger than entries further from the top of the list. The manner in which the adjustment factor decreases can vary. In this example, the adjustment factor decreases by 5 seconds for each entry.

The adjustment factor for entries in the T2 or frequent list may be the same or different. In this example, the adjustment factor for the entries in the T2 list are double the adjustment factor for the entries in the T1 list. Thus, the entry 01 (at the top of the T2 list) has an adjustment factor of 60 seconds and the entry 02 has an adjustment factor of 50 seconds. The adjustment factors applied to entries in the T2 list may decrease by a factor, a constant, or the like as the entry index increases (the index of the entry at the top of the list is 0 and the index for the nth entry is n).

When the eviction engine 328 processes the entries in the cache 320 represented in the table 322 whose characteristics or metadata have been adjusted with an adjustment factor, the eviction engine 328 identifies a single candidate for eviction—entry 03. This is true, in this example, even if the eviction engine 328 is configured to identify a maximum of two entries for eviction. Thus, as illustrated in the table 324, the entry 03 is evicted from the cache 320.

More specifically in this example, assuming that the threshold time was 10:03:01, all of the entries except the entry 03 had an adjusted timestamp that was greater than or later than the threshold time. Further, the entry 03 has the lowest frequency of use. Further, the entry 03 has a lower recency than the other entries in the cache 320 and the frequency of use for the entry 03 was equal to that of the entry 02. Thus, the eviction engine 328, compared to FIG. 3B, evicted an entry that was a better candidate for eviction than the entries 00 and 01, which were evicted by the eviction engine 312 that did not use an adjustment factor. The frequency of use is not affected by the adjustment factor in one embodiment.

Embodiments of the invention, thus provide novel cache eviction strategies and are capable of evicting multiple entries at the same time. Entries that are frequently or recently used are not evicted because the adjustment factor prevents these entries from being identified as candidates for eviction based on the time threshold.

Figure 4:
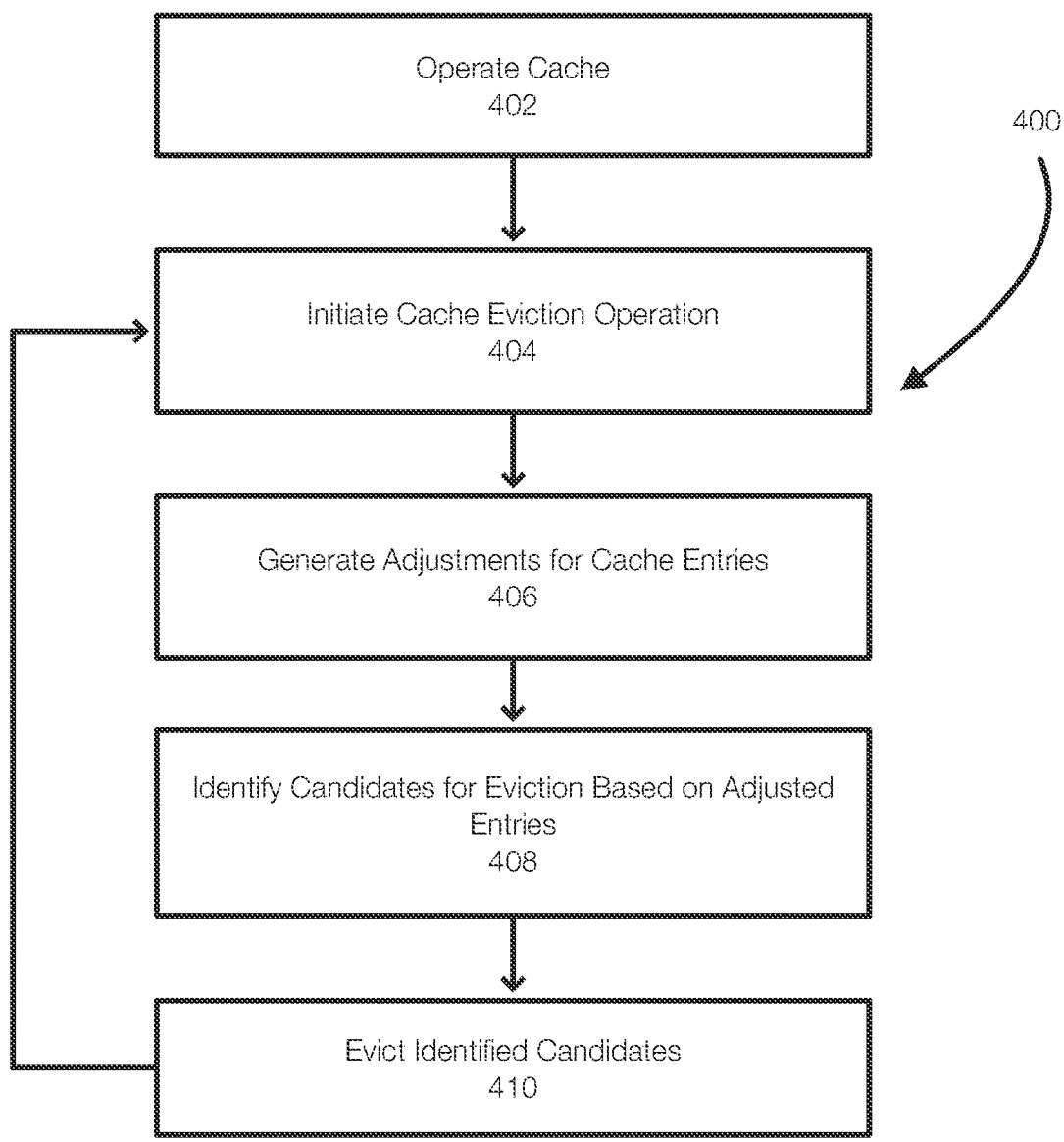
FIG. 4 discloses aspects of performing operations such as an eviction operation.

FIG. 4 discloses aspects of a method for performing an eviction operation. In one example, the cache may implement an eviction strategy based on one or more aspects or characteristics of the entries in the cache including, but not limited to, recency, frequency, and time (i.e., a timestamp). In one example, the eviction operation may adjust at least some of the characteristics or metadata of the entries prior to identifying candidates for eviction. Some of the elements may be performed on an ongoing basis, periodically, or less frequently than other elements of the method 400.

In this example method 400, the cache operates 402 normally and includes an entry list or cache directory. The cache entry list may include a recent list and a frequent list. Normal operation may include adding new entries to the cache or accessing existing entries in the cache. When these actions occur, the entry list is adjusted as previously described.

Next, a cache eviction operation may be initiated 404 or triggered. In one example, the cache eviction operation includes aspects of a time threshold-based eviction operation. Thus, a threshold time may be established or determined. The time threshold may be determined by default, by user input, or the like.

Once the eviction operation is initiated, adjustments for the cache entries may be generated 406. The adjustments to the cache entries can all be determined by the eviction process. Alternatively, adjustments may be determined or recalculated as entries are newly added or rearranged. Thus, the adjustment values may already be generated when an eviction operation is generated. The adjustments may need to be refreshed in some examples. Generating 406 the adjustments can include generating an adjusted timestamp (i.e., adjusted timestamp since last access) by adjusting or altering the timestamp since last access by the adjustment factor.

Once the adjustments or adjusted timestamps are generated, candidates for eviction are identified 408 based on the adjusted entries. Because the eviction operation identifies candidates based on a time threshold, the candidates are identified by comparing the time threshold to the adjusted timestamps of the cache entries.

In one example, the eviction operation may identify all candidates for eviction. In this case, the candidates are identified 408 and the earliest entries are evicted 410. This number may be limited by a maximum. In another example, the eviction operation identifies 408 candidates until the maximum number of candidates have been found. In either case or in other embodiments, the identified entries (up to the maximum) are then evicted 410. In one example, it is not necessary to evict the maximum number of entries from the cache.

In these examples, embodiments of the invention allow the time threshold-based cache eviction operation to account for recency and/or frequency of the cache entries rather than simply relying on identified candidates based on the time threshold alone.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, cache operations including cache eviction operations, least frequently used operations, frequency and/or recency-based operations, time threshold-based operations, or combination thereof. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any data backup platforms or data storage environments.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment. Cache operations may be implemented therein.

In addition to the cloud environment, the operating environment may also include one or more clients that are capable of collecting, modifying, and creating, data. These clients may use caches during these operations. As such, a particular client may employ, or otherwise be associated with, one or more instances of each of one or more applications that perform such operations with respect to data including cache related operations. Such clients may comprise physical machines, or virtual machines (VM) or containers.

Particularly, devices in the operating environment may take the form of software, physical machines, or VMs, or containers, or any combination of these, though no particular device implementation or configuration is required for any embodiment. Similarly, data protection system components such as databases, storage servers, As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: initiating a cache eviction operation, generating an adjustment for a characteristic of each entry in the cache, identifying candidates for eviction from the cache based at least on the adjusted characteristic, and evicting at least one of the identified candidates from the cache.

Embodiment 2. The method of embodiment 1, wherein the characteristic is a timestamp of last access, further comprising adjusting the timestamp of last access of each entry by an adjustment value.

Embodiment 3. The method of embodiment 1 and/or 2, wherein the adjustment value for different entries is different.

Embodiment 4. The method of embodiment 1, 2, and/or 3, wherein the cache comprises an entry list that includes a recent list and a frequent list, wherein adjustment values for entries in the recent list are different from adjustment values in the frequent list.

Embodiment 5. The method of embodiment 1, 2, 3, and/or 4, wherein the adjustment values for entries in the frequent list are larger than the adjustment values for entries in the recent list.

Embodiment 6. The method of embodiment 1, 2, 3, 4, and/or 5, wherein the adjustment values for entries near a top of the recent list are greater than the adjustment values for entries further from the top of the recent list and wherein the adjustment values for entries near a top of the frequent list are greater than the adjustment values for entries further from the top of the frequent list.

Embodiment 7. The method of embodiment 1, 2, 3, 4, 5, and/or 6, wherein the adjustments values for entries in the recent list decrease by a constant value moving from a top of the recent list to a bottom of the recent list and wherein the adjustments values for entries in the frequent list decrease by a constant value moving from a top of the frequent list to a bottom of the frequent list.

Embodiment 8. The method of embodiment 1, 2, 3, 4, 5, 6, and/or 7, wherein a number of candidates evicted is limited by an eviction threshold.

Embodiment 9. The method of embodiment 1, 2, 3, 4, 5, 6, 7, and/or 8, further comprising operating the cache, wherein the cache includes an entry list having a recent list and a frequent list, by: adding new entries to a top of the recent list, moving entries in the recent list that are accessed a second time to a top of the frequent list, and moving entries in the frequent list that are accessed another time to the top of the frequent list.

Embodiment 10. The method of embodiment 1, 2, 3, 4, 5, 6, 7, 8, and/or 9, further comprising storing, for each entry, a recency value and a frequency value.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
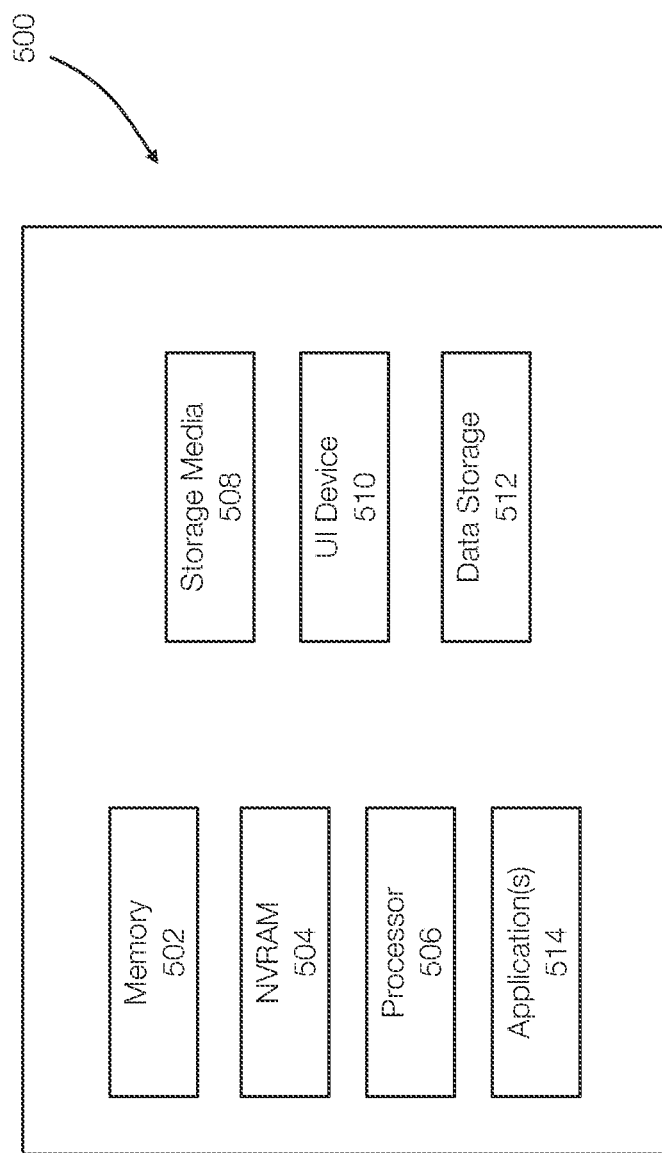
FIG. 5 discloses aspects of a computing device or a computing system.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random-access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein. One or more of the memory components 502 may include one or more caches. The caches may include multiple levels of caches.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    initiating a cache eviction operation for a cache, wherein the cache comprises an entry list that includes a recent list and a frequent list, wherein adjustment values for entries in the recent list are different from adjustment values in the frequent list;
    generating an adjustment for a characteristic of each entry in the cache;
    identifying candidates for eviction from the cache based at least on the adjusted characteristic; and
    evicting at least one of the identified candidates from the cache.

2. The method of claim 1, wherein the characteristic is a timestamp of last access, further comprising adjusting the timestamp of last access of each entry by an adjustment value.

3. The method of claim 2, wherein the adjustment value for different entries is different.

4. The method of claim 1, wherein the adjustment values for entries in the frequent list are larger than the adjustment values for entries in the recent list.

5. The method of claim 1, wherein the adjustment values for entries near a top of the recent list are greater than the adjustment values for entries further from the top of the recent list and wherein the adjustment values for entries near a top of the frequent list are greater than the adjustment values for entries further from the top of the frequent list.

6. The method of claim 1, wherein the adjustments values for entries in the recent list decrease by a constant value moving from a top of the recent list to a bottom of the recent list and wherein the adjustments values for entries in the frequent list decrease by a constant value moving from a top of the frequent list to a bottom of the frequent list.

7. The method of claim 1, wherein a number of candidates evicted is limited by an eviction threshold.

8. The method of claim 1, further comprising operating the cache, wherein the cache includes an entry list having a recent list and a frequent list, by:
    adding new entries to a top of the recent list;
    moving entries in the recent list that are accessed a second time to a top of the frequent list; and
    moving entries in the frequent list that are accessed another time to the top of the frequent list.

9. The method of claim 1, further comprising storing, for each entry, a recency value and a frequency value.

10. A non-transitory storage medium having stored therein instructions that are executable by one or more hardware processors to perform operations comprising:
    initiating a cache eviction operation for a cache, wherein the cache comprises an entry list that includes a recent list and a frequent list, wherein adjustment values for entries in the recent list are different from adjustment values in the frequent list;

generating an adjustment for a characteristic of each entry in the cache;

identifying candidates for eviction from the cache based at least on the adjusted characteristic; and evicting at least one of the identified candidates from the cache.

11. The non-transitory storage medium of claim 10, wherein the characteristic is a timestamp of last access, further comprising adjusting the timestamp of last access of each entry by an adjustment value.

12. The non-transitory storage medium of claim 11, wherein the adjustment value for different entries is different.

13. The non-transitory storage medium of claim 10, wherein the adjustment values for entries in the frequent list are larger than the adjustment values for entries in the recent list.

14. The non-transitory storage medium of claim 10, wherein the adjustment values for entries near a top of the recent list are greater than the adjustment values for entries further from the top of the recent list and wherein the adjustment values for entries near a top of the frequent list are greater than the adjustment values for entries further from the top of the frequent list.

15. The non-transitory storage medium of claim 10, wherein the adjustments values for entries in the recent list decrease by a constant value moving from a top of the recent list to a bottom of the recent list and wherein the adjustments values for entries in the frequent list decrease by a constant value moving from a top of the frequent list to a bottom of the frequent list.

16. The non-transitory storage medium of claim 10, wherein a number of candidates evicted is limited by an eviction threshold.

17. The non-transitory storage medium of claim 10, further comprising operating the cache, wherein the cache includes an entry list having a recent list and a frequent list, by:

adding new entries to a top of the recent list;

moving entries in the recent list that are accessed a second time to a top of the frequent list; and moving entries in the frequent list that are accessed another time to the top of the frequent list.

18. The non-transitory storage medium of claim 10, further comprising storing, for each entry, a recency value and a frequency value.

\* \* \* \* \*